United States Patent [19]

Bell

[11] Patent Number: 5,165,281
[45] Date of Patent: Nov. 24, 1992

[54] HIGH PRESSURE CAPACITIVE TRANSDUCER

[76] Inventor: Robert L. Bell, 5960 Grey Rock Rd., Agoura Hills, Calif. 91301

[21] Appl. No.: 410,948

[22] Filed: Sep. 22, 1989

[51] Int. Cl.⁵ .............................................. G01L 9/12
[52] U.S. Cl. .................................... 73/718; 73/706; 73/724; 361/283
[58] Field of Search ............... 73/706, 718, 724, 721, 73/715, 716, DIG. 4; 338/4; 361/283

[56] References Cited

U.S. PATENT DOCUMENTS

| | | | |
|---|---|---|---|
| 3,634,727 | 7/1972 | Polye | 317/231 |
| 3,858,097 | 12/1974 | Polye | 317/248 |
| 3,859,575 | 1/1975 | Lee et al. | 317/246 |
| 4,064,550 | 12/1977 | Dias et al. | 361/283 |
| 4,151,578 | 4/1979 | Bell | 361/283 |
| 4,177,496 | 12/1979 | Bell et al. | 361/283 |
| 4,207,604 | 6/1980 | Bell | 361/283 |
| 4,295,376 | 10/1981 | Bell | 73/724 |
| 4,565,096 | 1/1986 | Knecht | 73/718 |
| 4,586,109 | 4/1986 | Peters et al. | 361/283 |
| 4,609,966 | 9/1986 | Kuisma | 73/724 |
| 4,625,561 | 12/1986 | Mikkor | 73/724 |
| 4,628,403 | 12/1986 | Kuisma | 361/283 |
| 4,730,496 | 3/1988 | Knecht et al. | 73/718 |
| 4,875,134 | 10/1989 | Kuisma | 361/283 |

FOREIGN PATENT DOCUMENTS 0195985 10/1986 European Pat. Off. ............. 73/718
0148843 8/1984 Japan ..................................... 73/724

Primary Examiner—Donnie L. Crosland
Assistant Examiner—Brent A. Swarthout
Attorney, Agent, or Firm—Merchant, Gould, Smith, Edell, Welter & Schmidt

[57] ABSTRACT

A ceramic capacitive pressure transducer capable of withstanding high pressures without undue internal stresses incorporates a deflecting diaphragm having a three-dimensional contoured surface adjacent a central electrode bearing region and within a rigid periphery. A planar electrode bearing region of predetermined thickness is defined by a concavity on the pressure receiving side, limited by a shoulder at the periphery, and a groove on the electrode bearing side. This configuration primarily deforms in the contoured region, with tensile stresses arising from interior deflection of the electrode bearing region and rigid seating of the periphery being distributed through the groove region and also cancelling to some extent such that axial, radial and tangential stresses all are held well below allowable stress levels for the material.

15 Claims, 5 Drawing Sheets

HIGH PRESSURE CAPACITIVE TRANSDUCER

BACKGROUND OF THE INVENTION

This invention relates to force responsive transducers and particularly to capacitive transducers utilizing one or more capacitive elements to measure inputs with high precision, but also provides low cost manufacturing methods.

Numerous capacitive transducers are well known in the art. There are two classes of ceramic capacitive transducers. The first consists of devices that have two-dimensional structures located in a spaced apart manner, with a peripheral seal joining them together to form a capacitive element. This group of transducers is represented by the patents to Polye, U.S. Pat. Nos. 3,634,727 and 3,858,097, the patents to Beil et al, U.S. Pat. Nos. 4,151,578, 4,177,496 and 4,207,604, and the patent to Dias et al, U.S. Pat. No. 4,064,550. These transducers work best at low to middle range pressures (1 psi and 200 psi). At higher pressures, their peripheral seals are subjected to high tensile stresses which can cause catastrophic failure. Even before this point is reached, these two-dimensional designs provide poor results because of the inherently high stress levels. Most of these transducers also suffer poor nonlinearity performance since their two-dimensional nature leads to a fourth order deflection curve. In particular, the Bell et al U.S. Pat. No. 4,177,496 provides terminal based nonlinearities of greater than 2%. It also is limited to higher ranges, above 2 psi, because of the great difficulty in handling parts of 10 mils or less thickness in a manufacturing environment. In order to utilize this design below 2 psi, a significantly greater diameter, smaller diaphragm thickness, and/or higher electronic gain is required. All such solutions increase cost and reduce commercial viability.

The second class of transducers consists of transducers with movable spaced apart reference plates such as described in the patent to Lee et al U.S. Pat. No. 3,859,575 and the patent to Bell U.S. Pat. No. 4,295,376. In Lee's construction the deflectable diaphragm comprises the outer circumferential portion of the end cap of a hollow metal cylinder which can be threaded with a base structure which provides support for a spaced apart reference plate. The Bell transducer uses a novel, movable reference plate to provide a differential capacitive output, e.g., when the diaphragm deflects one capacitive increases in value and the other decreases in value. This design also incorporates torsional suspension elements to reduce the bending stresses in the joint that attaches and spaces apart the reference plate from the diaphragm. Unfortunately, these spacer elements are still highly stressed and may fail under high pressure and/or vibration.

Hence there is a need for new devices that offer better linearity, lower stress levels and resistance to vibration and shock, as well as being capable of measuring pressures up to 5000 psi. Such new device should offer stability over a wide temperature range, be amenable to low cost manufacturing techniques, such as thick film processing, and provide reliable performance over a long period of time.

One particular application is the vehicular field, where pressures from 200 psi to several thousand psi are to be monitored by the on-board computers now responsible for management of the engine and other vehicular systems such as transmission and hydraulic braking systems. The problem is to provide precise, linear inputs to these on-board computers in a cost effective way.

Another important application is in the field of process control wherein many measurements are made of fluid pressures, flows and levels in order to optimize throughput and increase the quality of the final product. Most of these "static" pressures are in the 100 psi to 3000 psi range.

SUMMARY OF THE INVENTION

In accordance with the present invention, a capacitive transducer includes a three-dimensional diaphragm structure that reduces and redistributes the stresses to minimize hysteresis and failure. The diaphragm includes two capacitors: one which varies significantly and linearly (L/C) with pressure as the diaphragm is deflected, with pressure and the other of which is relatively insensitive to pressure changes.

In general, pressure sensitive capacitor electrodes are deposited on oppositely facing, relatively parallel, central surfaces of a reference plate and the diaphragm. The diaphragm is not of uniform thickness, but has a three-dimensional structure, such as channels, flanges and nonconstant diaphragm thicknesses between the reference and sensing electrodes. In particular, the relatively constant reference capacitor is formed in a relatively thick outer peripheral flange region and is separated by thinner channel or flange microstructure from the relatively thick inner diaphragm structure bearing a sensor electrode. The sensing capacitor changes capacitance in response to the decrease of the spacing between the reference plate and the diaphragm. The channel, flange and varying thickness means significantly reduce the tensile stress in the diaphragm and provide a more linear (l/c) capacitance vs. pressure relationship. These three-dimensional structures also significantly lower the stresses at the peripheral spacers.

In a more particular example of a variable capacitance transducer in accordance with this invention, a three-dimensional diaphragm structure consists of three regions: (1) an outer thick section on which a reference capacitor and a spacer means separating the diaphragm from the reference plate are deposited; (2) an inner relatively planar deflecting region on which a pressure sensing electrode is deposited; and (3) an intermediate region which includes channels on the inside cavity formed by the reference plate-diaphragm assembly and an external variation in the thickness in approximately the same radial region as the channel. A reference plate overlays the channel side of the diaphragm, is joined to the diaphragm by the peripheral spacer/seal means, and has at least two deposited electrodes, one overlaying the outer diaphragm electrode and forming the stable reference capacitor and the second electrode overlaying the central diaphragm electrode and forming the pressure sensitive capacitor. As pressure is applied to the side of the diaphragm opposite the channel, the central spacing between the diaphragm and the reference plate is reduced giving rise to an increase in the central capacitor. The outer thick section surfaces remain at relatively the same distance from one another and therefore the outer capacitor does not significantly change its value.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
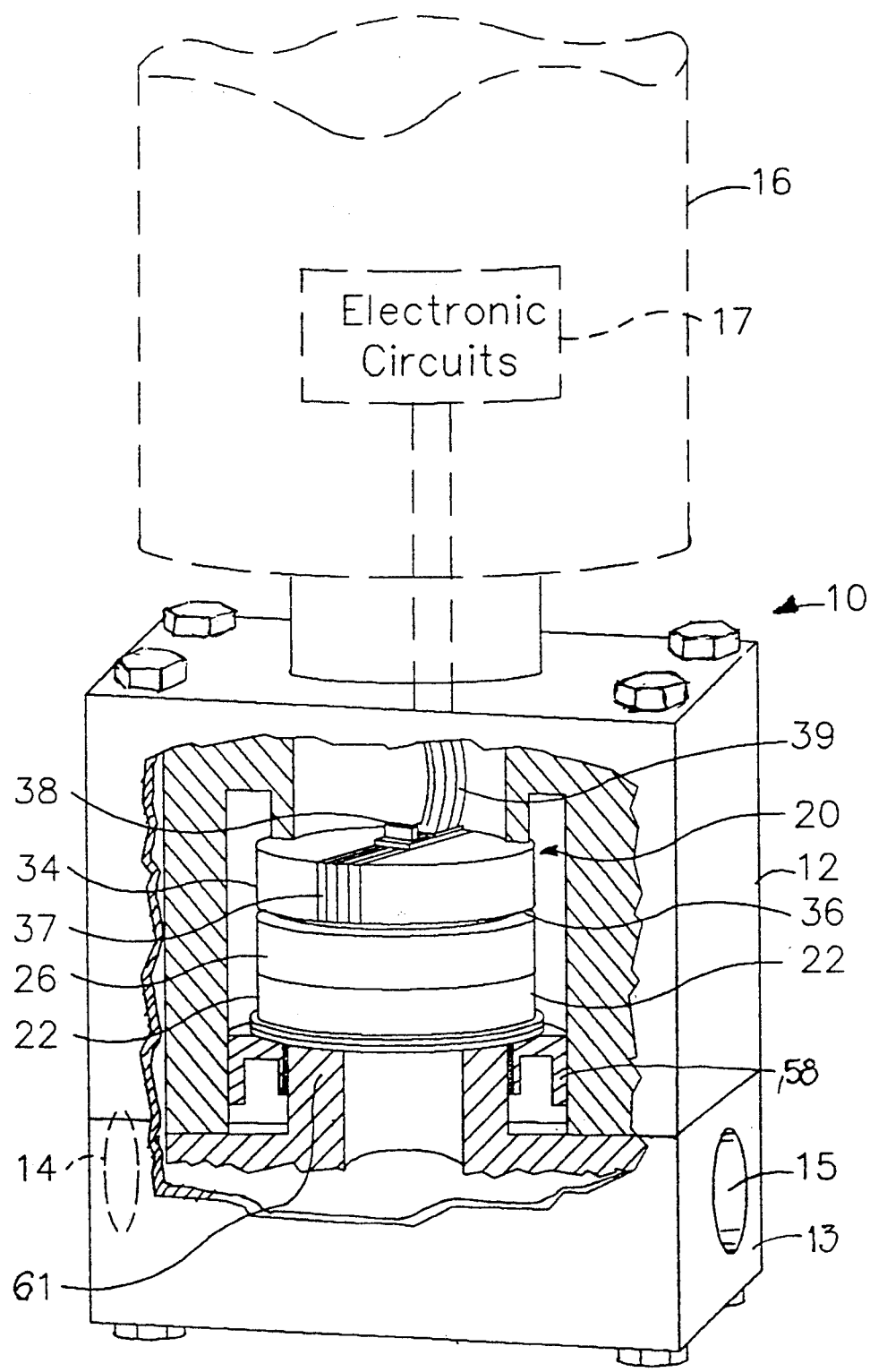
FIG. 1 is a perspective broken away view of a pressure transducer device in accordance with the invention.
Figure 2:
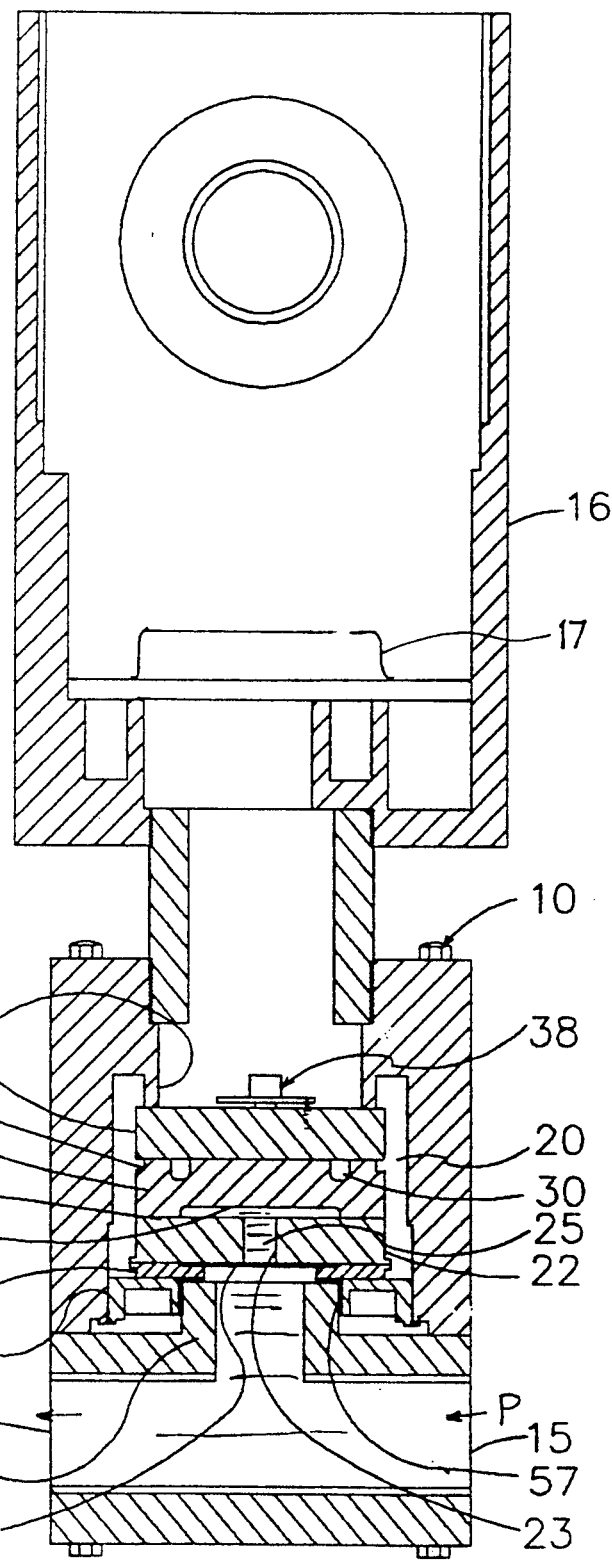
FIG. 2 is a side sectional view of the arrangement of FIG. 1.
Figure 3:
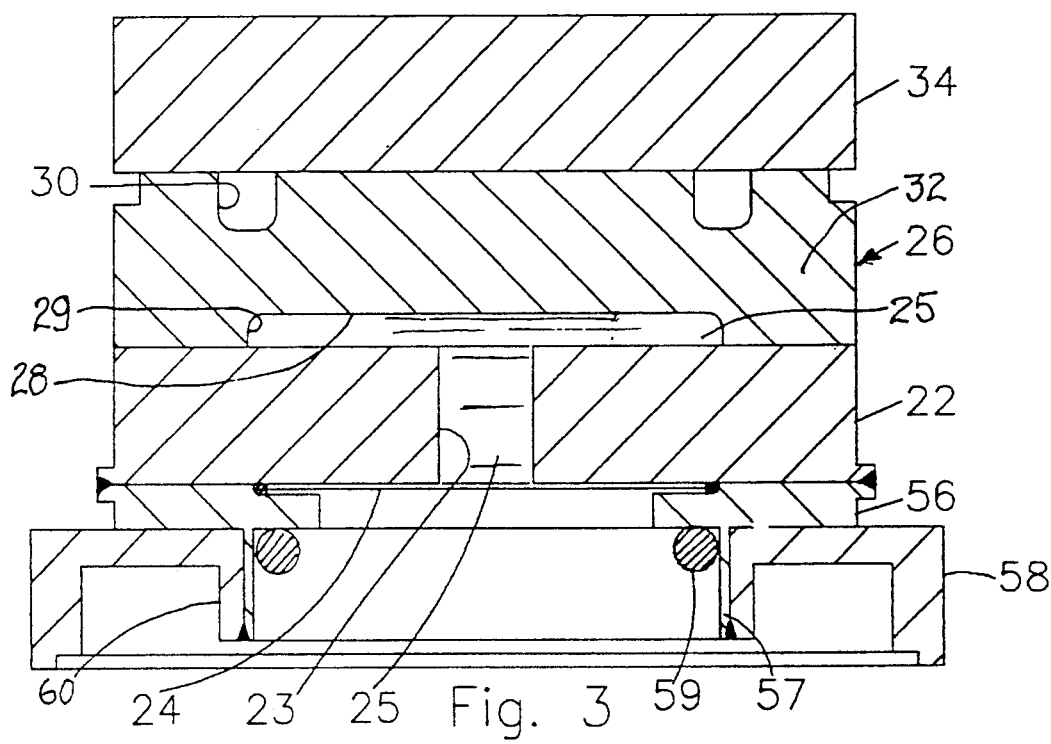
FIG. 3 is an enlarged sectional view of the transducer cell utilized in the pressure transducer of FIGS. 1 and 2.

A gauge or absolute pressure transducer 10 in accordance with the invention is shown in FIGS. 1-3, to which reference is now made. The term "transducer" refers to the entire unit, including housing and internal transducer circuits, for attachment to a fluid line, air or liquid, whose pressure is to be sensed. A primary housing 12, typically of stainless steel such as 17-4 Alloy is bolted to a stainless steel pressure port 13, such as 316SS. The 316SS pressure port includes fluid inlets and outlets 14, 15 on opposite sides. A circuit housing 16, also typically of stainless steel, is mounted on the upper side of the primary housing 12 in this example and contains electronic circuits 17 coupled to an associated system. The transducer 10 is intended to function in a very high pressure environment as in the range from 5,000 to 10,000 psi, in which range internal stress distributions often lead to output defects, such as nonlinearity or hysteresis.

Disposed within the primary housing 12 is a transducer cell 20 of largely but not entirely ceramic material. With reference to the vertical disposition shown in FIGS. 1-4, the cell 20 in this example is largely concentric about a central axis, and has a bottom metal washer 22 or support element of matched temperature characteristic material, such as Alloy 45. A central conduit 23 along the central axis provides an internal volume that is in communication with an isolation diaphragm 24 on the underside of the washer 22. An oil fill 25 occupies the volume between the isolation diaphragm 24 and an overlying ceramic diaphragm 26, of alumina or similar material, which is affixed by a glass peripheral seal to the metal washer 22. The ceramic diaphragm 26 includes a pressure side concavity 28 defined by an outer shoulder 29, such that the central region of the diaphragm 26 is very much more deflectable than the outer shoulder 29, so that the peripheral flange 32 defined outside the outer shoulder 29 has very low deflection under the high pressures to be encountered. The opposite (upper in this attitude) side of the diaphragm 26 is three-dimensionally contoured in a region radially coextensive with the shoulder 29, here incorporating a groove 30 concentric with the central axis. The groove 30 effectively defines the limits of the central deflectable region of the diaphragm 26, within the thicker flange 32.

Above the ceramic diaphragm 26 and attached to it by a peripheral glass seal 33 that establishes a precisely controlled spacing, of the order of 1-40 microns, is a reference plate 34, also of ceramic material. As discussed below in conjunction with FIGS. 6 and 7, electrodes on the side of the reference plate 34 facing the ceramic diaphragm 26, and on the diaphragm 26, provide sensing of the deflection of the ceramic diaphragm 26 under pressure variations. An outer notch 36 is inset about the ceramic diaphragm 26 at the upper edge, and provides space for the passage from the interior of the transducer cell 20 of electrical leads 37 (seen in FIG. 1 only) to attach circuits 38, such as digital or hybrid circuits on the top of the reference plate 34. From these circuits, a flexible cable 39 (seen in FIG. 1 only) leads to the electronic circuits 17 in the circuit housing 16.

Figure 4:
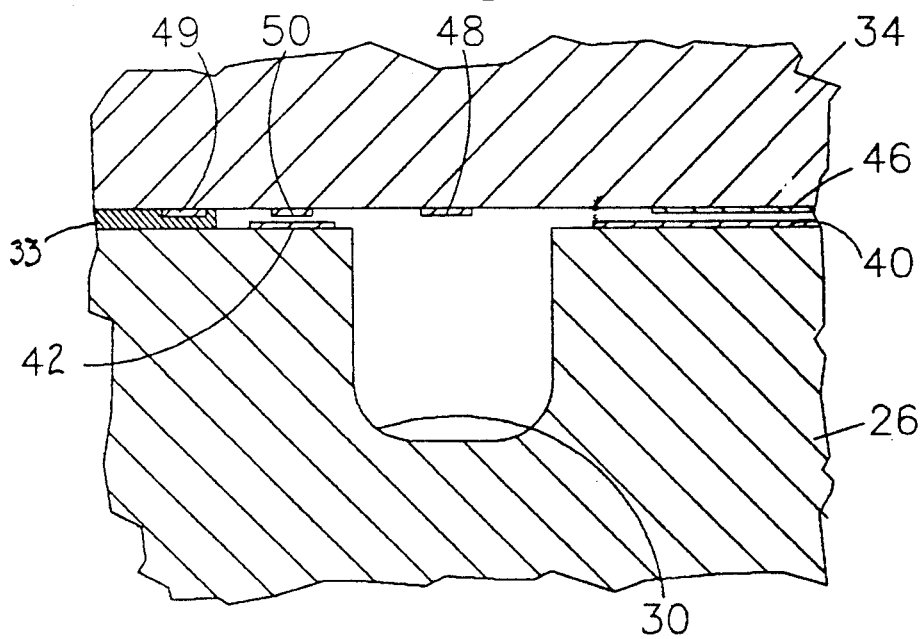
FIG. 4 is an enlarged fragmentary view of FIG. 3, showing electrode and seal ring dispositions in exaggerated scale.
Figure 6:
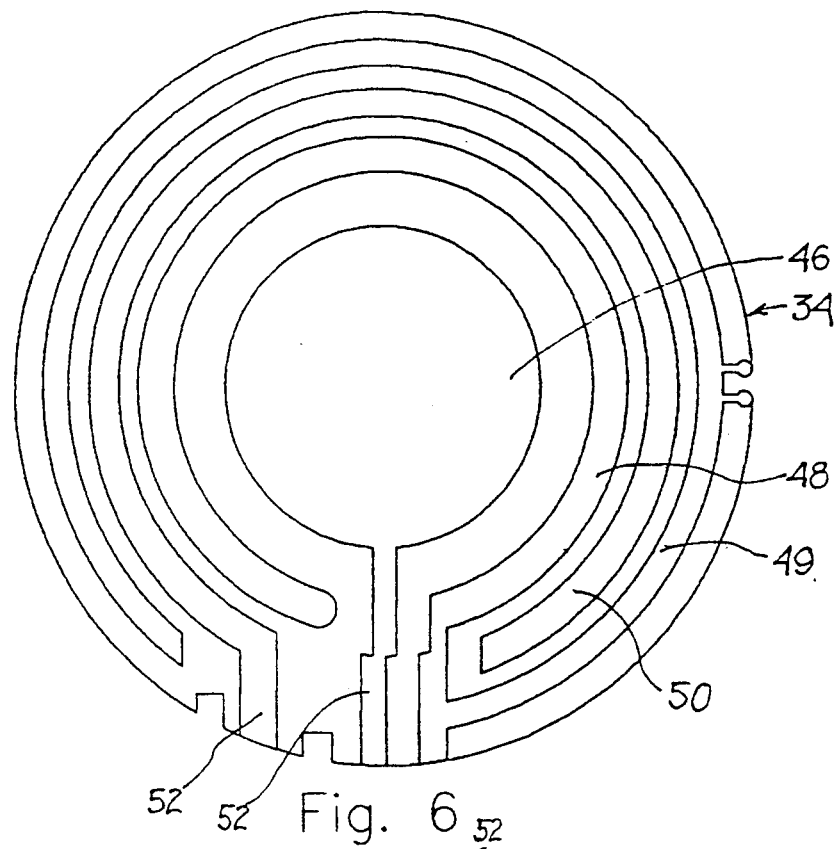
FIG. 6 is a plan view of the electrode pattern on the reference plate.
Figure 7:
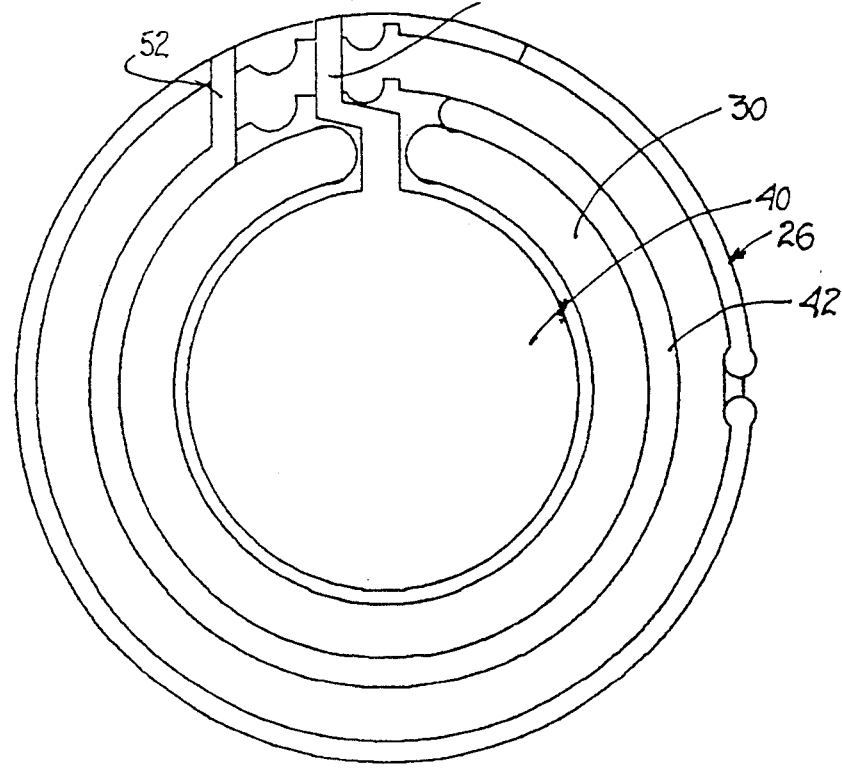
FIG. 7 is a plan view of the electrode pattern on the diaphragm.

As best seen in the side sectional view of FIG. 4 and the plan views of FIGS. 6 and 7, the very small spacing between the ceramic diaphragm 26 and reference plate 34 maintains a gap between a central sensor electrode 40, of generally circular shape on the diaphragm 26, this and other electrodes being deposited by screening techniques well known in the art. Outside the groove 30, the diaphragm 26 includes, also concentric with the central axis, an outer reference ring electrode 42, outside which is a peripheral glass bead and spacer 33 which attaches the diaphragm to the reference electrode 34 under suitable bonding conditions of temperature and pressure. The reference plate 34 has a central concentric sensor electrode 46, slightly smaller in diameter than the opposed central electrode 40 on the diaphragm 26. A pair of guard band electrodes 48, 49, concentric with the central axis and positioned to straddle the reference ring electrode 42 on the ceramic diaphragm, are disposed at different radial positions on the reference plate 34, and coupled in common to ground to prevent stray capacitance from disturbing the readings. The guard band electrodes 48, 49 are on opposite radial sides of a reference ring electrode 50 on the reference plate 34 in facing relation to the diaphragm reference electrode 42. Leads 52 on the element surfaces, comprise screened conductors coupled to each of the different electrodes separately, and lead to the periphery of the transducer cell 20, where electrical connection may be made to the exterior electrical leads 37 seen in FIG. 1.

The transducer cell 20 is supported on the metal ring or washer 22 which overlaps the periphery of the isolation diaphragm 24 and is peripherally clamped by an underlying metal corrosion washer 56. The corrosion washer 56 includes a depending axial flange 57 which engages the inner leg 60 of an inverted U-shaped weld ring 58, the outer leg of which is attached to the inner side of the housing 12. The axial flange 57 and inner leg 60 of the weld ring 58 are welded together at their end faces, and the base leg of the inverted weld ring 58 provides support for the underside of the corrosion washer 56. Protruding edge lips on the metal washer 22 and the corrosion washer 56 clamp the isolation diaphragm 24, and are joined together with a peripheral weld. The outer leg of the weld ring may also be attached to the inner wall of the housing 12 by a peripheral weld (not shown in FIG. 3).

The inner surface of the corrosion washer 56 is seated on the upper end of a bottom mount cylinder 62 (FIG. 2 only) about the central axis and forming a part of the bottom of the primary housing 12. An O-ring 59 is disposed in the corner of the corrosion washer 56 between the bottom surface and the depending axial flange 57 to seal against the pressure port flange. At the upper end of the transducer cell 20, the top of the reference plate 34, and the region near its periphery, engages the lower end of an upper retainer cylinder 62 (FIGS. 1 and 2 only). Fluid pressure forces acting against the underside of the ceramic diaphragm 26 are transmitted through the thickened peripheral flange at the outer periphery of the diaphragm 26 and through the corresponding region of the overlying reference plate 32 against the upper retainer cylinder 62.

Figure 5:
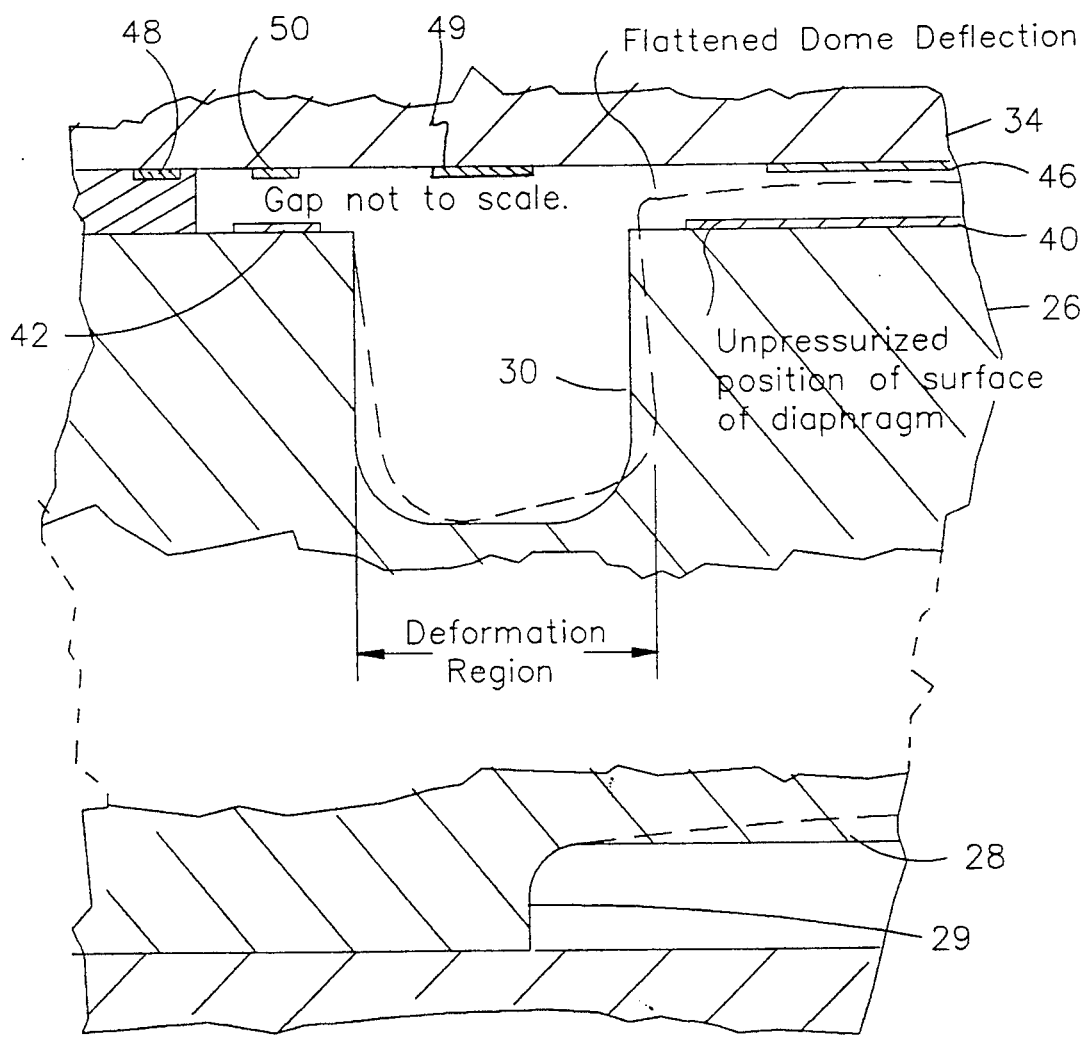
FIG. 5 is an enlarged fragmentary view of FIG. 4, further exaggerating the gap and showing deformation and displacement characteristics in exaggerated form for clarity.

In the operation of the system of FIGS. 1-4, the oil fill 25 occupies the interior volume above the isolation diaphragm 24, the undersurface of which receives the force of the fluid pressure that is to be measured. The oil fill is substantially incompressible, so that (as best seen in FIGS. 3-6) high pressure levels acting on the isolation diaphragm 24 are transferred to the concavity 28 on the underside of the diaphragm 26, causing deformation and deflection thereof. However, in the event of overload, the isolation diaphragm 24 engages the underside of the reference plate 22, which is flat, and which thus provides a backup protection against excessive pressure forces. The space between the diaphragm 26 and the reference plate 34 is typically very small (1-40 microns as indicated above), and consequently is shown in exaggerated form in FIGS. 4-5. The thick film electrodes deposited on the members are also illustrated in exaggerated form for ease of visualization, and are not to scale. Similarly, the displacement effect of high pressure on the diaphragm 26 is substantially exaggerated in FIG. 5, in terms both of the gap relative to the groove 30 in the diaphragm, and in the nature of the deformation and deviations which result. However, these exaggerations aid in visualizing the significant contributions of the invention, which comprise two major factors that are interrelated. For one thing, as best seen in FIG. 5, deformation or bending, as opposed to deflection or displacement, occurs primarily at the region in which the upper surface of the diaphragm 26 is three-dimensionally shaped or sculpted. Thus, in FIG. 5, pressure acting on the underside of the diaphragm 26 at the concavity 28, introduces bending at the concentric groove 30, while the thicker outer flange outside the shoulder 29 is not significantly displaced. Consequently, deformation in the bottom region of the diaphragm 26 is in the nature of a fourth order curvature, shown in greatly exaggerated form in FIG. 5, because the outer periphery outside the shoulder is restrained. Thus the displacement immediately inward of the shoulder 29 changes slope at a low rate at the outset, but thereafter increases at a greater rate, then diminishes as the center of the concavity 28 is approached. However, deformation occurs primarily in the web region of the diaphragm 26 between the shoulder 29 at the lower part of the diaphragm and the concentric groove 30 at the upper part of the diaphragm 26, because this is the thinnest and most flexible portion in the axial direction. Consequently, diaphragm 26 bending takes place about, rather than within, the central region occupied by the sensing electrode 40. This may be viewed as an intermediate flexing or hinging region. The central region of the diaphragm 26 is displaced upwardly with a much more uniform displacement throughout its area so that the sensing electrode 40 moves essentially as a planar front toward the sensor electrode 46 on the reference plate 34 (FIG. 5). Consequently, the variation in capacitance reading, which must be highly precise, is more accurate than it would be with one electrode of substantially varying curvature facing a flat electrode, with a variable gap between them.

An interrelated effect of benefit, also extremely important, is that this arrangement maintains all of the internal stresses within the diaphragm 26 within acceptable limits, typically less than 10,000 psi. Stresses in compression and tension are kept within limits in both radial and hoop directions. The effect of the three-dimensional relief provided by the groove 30 is to redistribute the internal stresses within the diaphragm 26 locally, by providing, in this example, what may be regarded as a concentric hinge. Studying the results of computations prepared by finite element analysis, it is found that tangential, hoop and radial stresses maintain tensile stresses below 12,000 psi for an applied pressure of 5,000 psi. The diaphragm and reference plate bodies are predominantly in a neutral, low pressure stress range for each of these analyses. For hoop stress, the analysis shows that peak levels of tension stress are reached in the center of the electrode bearing region but that these are substantially diminished before the radius becomes large enough to encounter the groove. On the opposite side of the diaphragm, compression stresses are greatest near the center, and diminish substantially in the radially outward direction to be substantially less by the radius at which the shoulder 29 is located.

Radial stresses are quite similar to the hoop stresses, except that a peak of tension is localized at the inner radial corner of the groove 30, and the peak of compression is located at the outer radial groove and at the inner region of the seal adjacent the groove. Again, however, all stresses are within the acceptable range. Tangential stresses are acceptably low in all regions except that peaks are encountered at the inner corner of the groove (tension) and the outer corner of the groove (compression).

The net result of this arrangement is to provide a stress attenuation and redistribution function which minimizes peaks of tension and compression. Consequently, alumina, which is a stable, temperature-insensitive material that is strong and can readily be molded to fairly complex shapes, can be utilized even though it has a brittleness which appears when localized stresses become excessive.

Although the present arrangement is described in terms of the usage of oil fill and an isolation diaphragm, these merely provide one example of a system that is advantageous where contaminants or corrosive elements are apt to create problems with sealing or system reliability. If it is not desired to utilize an isolation diaphragm, the corrosion washer and metal washer are not utilized, but are supplanted by a housing that seals against the ceramic shoulder area 29 with an O-ring seal.

Although a number of forms and variations in accordance with the invention have been described, it will be appreciated that the invention is not limited thereto but encompasses all modifications and alternative expedients in accordance with the appended claims.

What is claimed is:
1. A capacitive pressure transducer comprising:
   a substantially non-deflecting reference member of predetermined outline and having a planar reference surface;

a diaphragm member adjacent the planar reference surface of the reference member in facing relation, the diaphragm member having two sides and including a rigid periphery secured to the reference member and a central deflection region interior to the periphery, a substantially flat surface adjacent and facing the reference member and defining a gap region therebetween, ad the diaphragm member including concavities on both sides defining a hinging portion about an interior deflection region of greater rigidity than the hinging portion, such that principal deformation in response to pressure occurs in the hinging portion, the concavity on the side adjacent the reference member being disposed about the interior deflection region and the concavity on the side opposite the reference member extending across the central deflection region;

means for applying pressure to be sensed to the interior deflection region of the diaphragm member on the side opposite the reference member; and thin planar electrode means disposed on the opposing surfaces of the reference member and the diaphragm member in the gap region.

2. A transducer as set forth in claim 1 above, wherein the reference member and diaphragm member have substantially member is circular in outline and substantially coextensive with the reference member, and further including bonding means about the periphery between the reference and diaphragm members to provide a nominal spacing between the flat surfaces of the order of 1 to 40 microns.

3. A transducer as set forth in claim 2 above, wherein the concavities comprise a circular groove in the diaphragm on the side of the reference member within the periphery but bounding the interior deflection region, and a concavity in the opposite side having a circular edge opposite the region of the groove.

4. A transducer as set forth in claim 3 above, wherein the pressure is applied to the interior deflection region of the diaphragm member on the interior the reference member and the bonding means provides a seal for maintaining an evacuated interior in the gap region.

5. A capacitive pressure transducer comprising:

a substantially non-deflecting reference member of predetermined outline having a substantially flat surface;

a diaphragm member of circular outline and substantially coextensive with the reference member, the diaphragm member having a substantially flat surface in facing relation to the substantially flat surface of the reference member and forming a gap region therebetween, the diaphragm member having two sides and including a rigid periphery, and including concavities on both sides defining a hinging portion about an interior deflection region of greater rigidity than the hinging portion, the concavities comprising a circular groove in the diaphragm on the same side as the reference member within the periphery but bounding the interior deflection region, and a concavity in the opposite side having a circular edge opposite the region of the groove, such that principal deformation in response to pressure occurs in the hinging portion;

bonding means about the periphery between the reference and diaphragm members to provide a nominal spacing between the flat surfaces and a seal for maintaining an evacuated interior in the gap region of the order of 1 to 40 microns;

means for applying pressure to be sensed to the interior deflection region of the diaphragm member on the opposite side form the reference member;

thin planar electrode means disposed on the opposing surfaces of the reference member and the diaphragm member in the interior region; and first reference electrode means disposed on the diaphragm member outside the hinging portion and within the periphery, and second reference electrode means disposed on the reference member substantially opposite the first reference electrode means.

6. A transducer as set forth in claim 5 above, further including electrical terminal means extending along the side of the diaphragm member and reference member.

7. A transducer as set forth in claim 6 above, including an isolation diaphragm disposed across the pressure applying path to provide an enclosed interior volume in communication with the diaphragm member on the side opposite the reference member, and oil fill means filling the enclosed interior volume.

8. A transducer as set forth in claim 7 above, including in addition a metal ring joined at one side to the periphery of the diaphragm means and at the other side to the isolation diaphragm, the metal ring including an interior aperture providing a pressure communicating path for the oil fill means between the isolation diaphragm and the diaphragm means.

9. A transducer as set forth in claim 8 above, including in addition a housing encompassing the diaphragm and reference member and isolation diaphragm, wherein the housing includes annular supports engaging the reference member and the metal ring, means for providing a fluid whose pressure is to be measured to the isolation diaphragm, and means coupled to the housing and providing an enclosure for electrical circuits.

10. A capacitive pressure transducer for operation under high applied pressures comprising:

a ceramic diaphragm having a rigid periphery and an interior central deflection region, the periphery having a predetermined first thickness and a width sufficient to be substantially undeflected under the pressures to be applied, the central region having a predetermined second thickness and including a concavity defining a central wall offset on a fist side of the diaphragm from the periphery at a boundary wall and establishing a diaphragm surface against which the pressure to be measured is applied, the opposite second side of the central wall from the first side being planar and including a thin surface electrode, the diaphragm further including means in the second side defining an interconnecting integral web of less than the predetermined second thickness between the periphery and the central wall, the outside diameter of said web being greater than the diameter of the boundary wall, the inside diameter of said web being less than the diameter of the boundary wall, the web thickness being selected such that the deformation of the diaphragm in response to pressure is primarily in the web region and internal tensile stresses in the diaphragm are at least partially cancelled by compressive stressed in the body of the diaphragm in the region of the web; and a ceramic reference member spanning the diaphragm on the side opposite the first side and affixed to the periphery of the diaphragm, the reference member having a thickness such that it is substantially undeflected by the pressures applied to the surface of the diaphragm that includes the concavity;

wherein the interconnecting web is disposed configured in three dimensions to redistribute stresses by virtue of the three dimensional geometry defining the web and the relative positions of the web and boundary wall, so that tensile stresses are maintained below 12,000 psi for an applied pressure of 5,000 psi 11. A pressure transducer as set forth in claim 10 above, wherein the deformation in the web region substantially exceeds that in the central wall and the central wall deflects in substantially planar fashion toward the reference member.

12. A transducer as set forth in claim 11 above, further including bonding means joining the diaphragm and reference member together about the periphery, and spacing the second side of the diaphragm from the opposed side of the reference member by a predetermined distance.

13. A transducer as set forth in claim 10 above, wherein the diaphragm on the first side has a shoulder between the periphery and the central wall, wherein the web is defined in part by a groove about the central wall on the opposite side, and the shoulder is in the region of the groove.

14. A capacitive pressure transducer for high pressure operation comprising:

a ceramic diaphragm having a rigid periphery and an interior central deflection region, the periphery having a predetermined first thickness and a width to be substantially undeflected under the pressures to be applied, the central region having a predetermined second thickness defining a central wall offset on a first side of the diaphragm from the periphery to establish a concavity against which the pressure to be measured is applied, the opposite side of the central wall from the first side being planar and including a thin surface electrode, the diaphragm further including an interconnecting integral web of less than the predetermined thickness between the periphery and the central wall, the web location and thickness being selected such that the deformation in response to pressure is primarily in the web region and internal tensile stresses are at least partially cancelled by compressive stresses, wherein the interconnecting web is configured in three dimensions to redistribute stresses, so that tensile stresses are maintained below 12,000 psi for an applied pressure of 5,000 psi, and wherein the deformation in the web region substantially exceeds that in the central wall and the central wall deflects in substantially planar fashion toward the reference member;

a ceramic reference member spanning the diaphragm on the side opposite the first side and affixed to the periphery of the diaphragm, the reference member having a thickness such that it is substantially undeflected by the pressures applied;

bonding means joining the diaphragm and reference member together about the periphery, and spacing the second side of the diaphragm from the opposed side of the reference member by a predetermined distance; and reference electrode means in the peripheral region of the diaphragm and reference member on the opposed surfaces thereon.

15. A transducer as set forth in claim 14 above, wherein the diaphragm and reference member are circular in outline about a central axis, and wherein the integral web is defined by a groove concentric with the central axis and disposed in the second side of the diaphragm.

* * * * *

UNITED STATES PATENT AND TRADEMARK OFFICE
CERTIFICATE OF CORRECTION

PATENT NO. : 5,165,281
DATED : November 24, 1992
INVENTOR(S) : Robert L. Bell

It is certified that error appears in the above-indentified patent and that said Letters Patent is hereby corrected as shown below:

Column 7, line 8, "ad" should read —and—
line 26, after "substantially" insert —flat surfaces in facing relation, wherein the diaphragm—
line 40, "interior" should read —opposite side from—

Column 8, line 45, "fist" should read —first—
line 63, "stressed" should read —stresses—

Signed and Sealed this

Second Day of November, 1993

Attest:

BRUCE LEHMAN

Attesting Officer     Commissioner of Patents and Trademarks